US 9,562,559 B2

(12) United States Patent
Schomaker et al.

(10) Patent No.: US 9,562,559 B2
(45) Date of Patent: Feb. 7, 2017

(54) CONNECTING ARRANGEMENT AND ALSO A METHOD

(71) Applicant: Airbus Operations GmbH, Hamburg (DE)

(72) Inventors: Ralf Schomaker, Hamburg (DE); Bjoern Knickrehm, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 124 days.

(21) Appl. No.: 14/376,801

(22) PCT Filed: Feb. 11, 2013

(86) PCT No.: PCT/EP2013/052674
§ 371 (c)(1),
(2) Date: Aug. 5, 2014

(87) PCT Pub. No.: WO2013/117756
PCT Pub. Date: Aug. 15, 2013

(65) Prior Publication Data
US 2014/0373359 A1 Dec. 25, 2014

Related U.S. Application Data

(60) Provisional application No. 61/597,199, filed on Feb. 10, 2012.

(30) Foreign Application Priority Data

Feb. 10, 2012 (DE) .................. 10 2012 202 053

(51) Int. Cl.
*F16B 43/00* (2006.01)
*B64D 15/02* (2006.01)
(Continued)

(52) U.S. Cl.
CPC ............. *F16B 43/001* (2013.01); *B64D 45/02* (2013.01); *F16B 5/00* (2013.01); *F16B 5/02* (2013.01);
(Continued)

(58) Field of Classification Search
CPC ............. F16B 43/001; F16B 5/00; F16B 5/02; F16B 19/02; B64D 45/02; Y10T 29/49909; Y10T 29/49876; Y10T 29/49885; Y10T 29/49622; Y10T 403/74
See application file for complete search history.

(56) References Cited

U.S. PATENT DOCUMENTS 4,324,373 A 4/1982 Zibritosky
4,502,092 A 2/1985 Bannink et al.
(Continued)

FOREIGN PATENT DOCUMENTS

DE 69801752 7/2002
DE 202007019163 2/2011
(Continued)

OTHER PUBLICATIONS

German Search Report, Nov. 16, 2012.
International Search Report, Apr. 15, 2013.

*Primary Examiner* — John C Hong
(74) *Attorney, Agent, or Firm* — Greer, Burns & Crain, Ltd.

(57) ABSTRACT

A connecting arrangement for joining at least two components to form a structural assembly, near a wing of an aircraft, wherein at least one component is formed from a fiber composite plastic and at least one further component is formed from either a metal or a fiber composite plastic. A bushing is secured in a hole through the components. The bushing includes a first end with a collar which faces towards a lower face of the structural assembly and a second end. A zone of an upper face of the structural assembly (Continued)

radially surrounds the second end and includes a depression. A connecting element is installed in the bushing. This provides a smooth, aerodynamically beneficial configuration of the upper face, which can be coated, and which ensures a reliable electrical contact between the connecting element and a conductive surface of the first component.

19 Claims, 6 Drawing Sheets

(51) Int. Cl.
  *F16B 5/00* (2006.01)
  *B64D 45/02* (2006.01)
  *F16B 5/02* (2006.01)
  *F16B 19/02* (2006.01)
(52) U.S. Cl.
  CPC ........... *F16B 19/02* (2013.01); *Y10T 29/49622* (2015.01); *Y10T 29/49876* (2015.01); *Y10T 29/49885* (2015.01); *Y10T 29/49909* (2015.01); *Y10T 403/74* (2015.01)

(56) References Cited

U.S. PATENT DOCUMENTS

| | | |
|---|---|---|
| 4,755,904 A | 7/1988 | Brick |
| 5,175,665 A | 12/1992 | Pegg |
| 6,327,132 B1 | 12/2001 | Andrivet |
| 2010/0276536 A1 | 11/2010 | Lambert et al. |
| 2011/0182692 A1 | 7/2011 | Reid et al. |
| 2012/0074257 A1 | 3/2012 | Bessho |

FOREIGN PATENT DOCUMENTS

| | | |
|---|---|---|
| EP | 0248122 | 12/1987 |
| FR | 2626629 | 8/1989 |
| FR | 2924686 | 6/2009 |
| WO | 2010113523 | 10/2010 |

CONNECTING ARRANGEMENT AND ALSO A METHOD

CROSS-REFERENCES TO RELATED APPLICATIONS

This application claims the benefit of the U.S. Provisional Application No. 61/597,199, filed on Feb. 10, 2012, and of the German patent application No. 10 2012 202 053.5 filed on Feb. 10, 2012, the entire disclosures of which are incorporated herein by way of reference.

BACKGROUND OF THE INVENTION

The invention concerns a connecting arrangement for joining together at least two components to form a structural assembly, in particular in the region of a wing of an aircraft, wherein at least one component is formed from a fibre composite plastic and at least one further component is formed from a metal, or at least two components are formed from a fibre composite plastic.

Furthermore the invention concerns a method for joining together at least two components, in particular by means of a connecting arrangement, to form a structural assembly, in particular in the region of a wing of an aircraft, wherein at least one component is formed from a fibre composite plastic and at least one further component is formed from a metal, or at least two components are formed from a fibre composite plastic.

In modern aircraft construction alongside the traditional homogeneous aluminium form of construction of the primary structure the hybrid form of construction using metallic materials and fibre composite plastics is being deployed to an increasing extent. The combination of the different materials requires the deployment of a multiplicity of joining techniques and connecting elements. As fibre composite plastics carbon fibre reinforced thermosetting or thermoplastic plastics (CFRPs) are preferably deployed, while metallic components are preferably made from light metal alloys, such as, for example, titanium or aluminium alloys. Furthermore components from stainless steel alloys are also deployed.

From DE 20 2007 019 163 U1 a high-performance press fit securement device for composite material applications is of known art. In the case of this connecting element, i.e., a sleeve rivet, a sleeve with a conical widening in the head region is introduced into a hole passing through the components that are to be joined. The sleeve is then radially expanded by the insertion of the locking ring pin, (the so-called sleeve fastener), in order to achieve a secure press fit within the through hole and a durable connection of the components. By means of the sleeve the risk of a delamination in the hole reveal region of the fibre composite components that are involved is reduced.

Such sleeve rivets required a complex installation process. Lightning strike protection (LSP), which is inevitably required in the case of CFRP components by virtue of their low intrinsic electrical conductivity, in the form of conductive mesh-type surface entities (so-called copper meshes), which at the same time can serve as earth return paths, can only be attached with a reliable level of contact to metallic components with much effort using the sleeve rivets of known art. Moreover the test evidence for a level of electrical contact in accordance with the regulations can only be obtained with difficulty. Furthermore the sleeve rivets generate high procurement and installation costs. In addition with the conventional sleeve rivets aerodynamic requirements can be satisfied only with difficulty, and ensuring the integrity of the sealing of the wing tanks proves to be difficult. In addition the visual impression after painting of wing components punctuated with sleeve rivets is impaired by the sleeve.

In addition from US 2011/0182692 A1 a securing element with a sleeve and a threaded nut, together with a method for their use, are of known art. The sleeve features an essentially hollow cylindrical two-part shank, which can be secured by radial expansion in a through hole of a workpiece by means of a press fit. The shank continues into a cage-type collar, which after the radial expansion of the sleeve sits against a workpiece surface. In the collar the threaded nut is accommodated loosely, for purposes of tolerance compensation, but such that it cannot be lost. A threaded bolt is, for example, screwed into the threaded nut for purposes of attaching a further component.

SUMMARY OF THE INVENTION

An object of the invention is to create a connecting arrangement for joining together of at least two components to form a structural assembly in the region of an aircraft wing, which does not lead to any significant unevenness in the region of an upper face of the structural assembly, which can be painted without any problems, which allows faultless contact to be made with an optional electrically conductive surface entity, and which is cost-effective with regard to procurement and installation.

In that a bushing is secured in a through hole through the components and a first end of the bushing is provided with a collar, which faces towards a lower face of the structural assembly, and a second end of the bushing and a radial zone of an upper face of the structural assembly radially surrounding this end have a depression, and in that a connecting element is installed in the bushing, there ensues, inter alia, an essentially completely plane configuration, advantageous in fluid mechanics terms, of the upper face of the structural assembly formed from two components joined together, since the depressed second end of the bushing terminates below the upper face of the structural assembly.

The bushing can, for example, be permanently secured by means of a press fit in the through hole. The required press fit can, for example, be achieved by means of a radial plastic expansion of the bushing by means of a suitable tool. In addition the necessary press fit can also be achieved by means of a thermal expansion after the bushing has been cooled down intensely (so-called "cold shrinkage"). In addition it is possible to secure the bushing durably in the through hole by means of material bonding, for example, by means of adhesive bonding. Furthermore the upper face of the structural assembly can be painted without any problems by virtue of an installation of the connecting arrangement that is carried out largely without any anti-friction agents. Furthermore, by means of the depression of the bushing and the annular zone of the upper face of the structural assembly surrounding this end, components of differing material thickness can be connected with one another using only one universal (standard) bushing. Conventional locking ring pins, tolerance rivets, solid rivets, blind rivets, pinned connections or similar, can for example be deployed as connecting elements. If required an inner diameter of the bushing can be increased after the radial widening of the bushing, for example by reaming. The bushing can have a geometrical shape deviating from the hollow cylindrical form, and can, for example, be designed to be slightly conical. In addition the cross-sectional geometry of the bushing can deviate from the shape of a circular ring, and can, for example, be configured so as to be slightly elliptical or oval. Correspondingly the spatial shape of the through hole can also deviate from that of a cylinder, and can, for example, have the geometry of a truncated cone or that of a cylinder with an elliptical cross-sectional geometry.

In accordance with an advantageous further development of the connecting arrangement provision is made that at least one component formed from the fibre composite plastic is provided in at least some regions with an electrically conductive surface entity. By this means a component produced from a fibre composite plastic can be equipped with lightning protection, and/or an earth return path can be implemented, while taking account of the components of fibre composite plastic. The surface entity is preferably formed from a copper mesh, which as a rule is embedded into the fibre composite plastic component near the surface.

In accordance with a further advantageous configuration an electrical connection exists between the at least two components. By this means the components joined together by means of the connecting arrangement can at the same time be electrically connected to a lightning protection system or an earth return path of an aircraft.

In a further advantageous configuration provision is made that a head of the connecting element sits in the depression in at least some regions in a form fit and essentially terminates flush with the upper face of the structural assembly. The result is an optimal force transfer between the joined components in the axial direction through the connecting element. The head of the connecting element preferably has a conical configuration, which in the ideal case corresponds completely with a similarly conical shaping of the depression. Here the truncated cone shape of the depression and the conical head of the connecting element have approximately the same angle of inclination. Geometrical shapes of the connecting element heads and depressions that deviate from the above are similarly possible.

In accordance with an advantageous further development the bushing and the connecting element are formed from a corrosion-resistant metal, in particular from a titanium alloy, or a stainless steel alloy. In particular, by this means any contact corrosion with adjacent components made from fibre composite plastics containing carbon fibres is avoided.

In accordance with a further configuration the fibre composite plastic is formed in particular from a thermosetting or a thermoplastic plastic material reinforced with carbon fibres, and the metal is a lightweight metal alloy, in particular an aluminium alloy of a titanium alloy. By this means there ensues, inter alia, a structural assembly formed from at least two components joined together that has a high mechanical load-bearing capability and at the same time low weight.

In a further development of the connecting arrangement a functional element, in particular a sealing cap, can be attached, in particular can be snapped onto, the collar of the bushing, or onto intermediate packing, in particular a cup-shaped washer, arranged between the collar and the lower face of the component. By this means the structural assembly can be completed in a manner that is impermeable to fluids. Furthermore the sealing cap protects the connecting arrangement from damaging environmental influences. Since the sealing cap can be snapped on a very reliable and secure fit with a long service life is ensured compared with the use of adhesive—this is of particular importance when the connecting arrangement is deployed in the wing tanks of aircraft that are difficult to access. By virtue of the intermediate packing, e.g., the cup-shaped washer, no retaining elements need to be designed on the bushing, such as, for example, latching projections for purposes of securing the sealing cap.

In a further configuration provision is made that a sealing agent, in particular an elastic sealant mass, is introduced underneath the sealing cap in at least some regions to provide sealing that is impermeable to fluids. By this means the sealing action of the sealing cap can be further enhanced.

In accordance with a further advantageous design the connecting element is in particular a locking ring connector with a locking ring pin and a locking ring, wherein the locking ring is attached onto a retaining section of the locking ring pin and the locking ring is facing towards the collar of the bushing. This enables recourse to proven, cost-effective connecting elements that are available in a large range of variants, and are already certified and authorised for use in aviation. Furthermore by means of the locking ring connector the components are mechanical joined in a manner that can be highly loaded.

Furthermore the inventive object is achieved by means of a with the following steps:

a) Introduction of a through hole into the at least two components, b) Securement of a bushing in the through hole, wherein a collar on a first end of the bushing is turned towards a lower face of the structural assembly, c) Manufacture of a depression on a second end of the bushing and in a zone of an upper face of the structural assembly surrounding this end, and d) Installation of a connecting element in the bushing, wherein a head of the connecting element sits in the depression in at least some regions in a form fit, and terminates essentially flush with the upper face of the structural assembly.

The inventive method enables the joining together of at least two components, in particular by means of the inventive connecting arrangement, to form a structural assembly, the upper face of which, despite the joining process, is substantially free of discontinuities, i.e., of unevenness. From this there results, inter alia, advantageous aerodynamic properties, as well as good adhesion of any coatings that are to be applied to the upper face, such as, for example, paints, films, etc. Furthermore the connection can optionally be sealed so as to be impermeable to fluids, and allows an electrically conducting connection of the joined components to a lightning protection system and/or to an earth return path of an aircraft. Accordingly the connecting arrangement manufactured in accordance with the method can, for example, find application in the wing tanks of aircraft. In step a) of the method a through hole is firstly introduced into the at least two components that are to be joined. Alternatively holes of the same size can be introduced separately into the components; these are then aligned flush with one another. In step b) of the method the securement of the bushing takes place. The bushing can, for example, be durably secured in the through hole by means of a press fit. The press fit to be created for purposes of an permanent securement can, for example, be achieved by means of a radial, plastic expansion of the bushing by means of a suitable tool. The bushing can be inserted into the through hole with an interference fit. As a result of the radial widening of the bushing there arises, inter alia, an increase of the load-bearing capability as a consequence of strain hardening in the reveal region of the through hole of a metallic component. Furthermore as a result of the expanded bushing the risk of delamination in the through hole of a component formed from fibre composite plastic, in particular with axial tensioning of the connecting element, is prevented. In addition the press fit securement of the bushing can be achieved by means of thermal expansion after the bushing has previously been cooled down intensely (so called "cold shrinkage"). Furthermore it is possible to secure the bushing permanently in the through hole by means of material bonding, for example, by means of adhesive bonding. In step c) of the method there takes place the introduction of a depression into the end of the bushing directed away from the collar, and also into the zone in the shape of a circular ring surrounding this end in the region of the upper face of the structural assembly. The depression is preferably of a conical design, but alternatively can also have a spatial geometry that deviates from the former. By this means can, inter alia, an axial length of the bushing be matched in a simple manner to various material thicknesses of the components that are to be joined. Since the bushing can be axially oversized or undersized with reference to the material thickness of the components that are to be joined, a multiplicity of components with differing thicknesses can be joined with a universal bushing with a standardised shank length. Furthermore as a result of the depression any unevenness as a consequence of the bushing being pushed into the through hole is eliminated. If necessary the bushing can be subjected to a finishing operation, for example, reaming. Finally in step d) of the method a suitable connecting element is installed in the bushing thus prepared, i.e., it is pulled into the latter, impressed, and secured, for example, by means of a locking ring. By this means the connecting process between the at least two components is completed. As a result of the head of the connecting element sitting essentially completely in the depression there ensues, inter alia, an optimal force transfer in the axial direction. Furthermore as a result of the preferably flush termination of the head of the connecting element an essentially smooth upper face of the structural assembly ensues.

BRIEF DESCRIPTION OF THE DRAWINGS

In the drawings.

In the drawings the same design elements have the same reference numbers in each case.

DETAILED DESCRIPTION OF THE PREFERRED EMBODIMENTS

Figure 1:
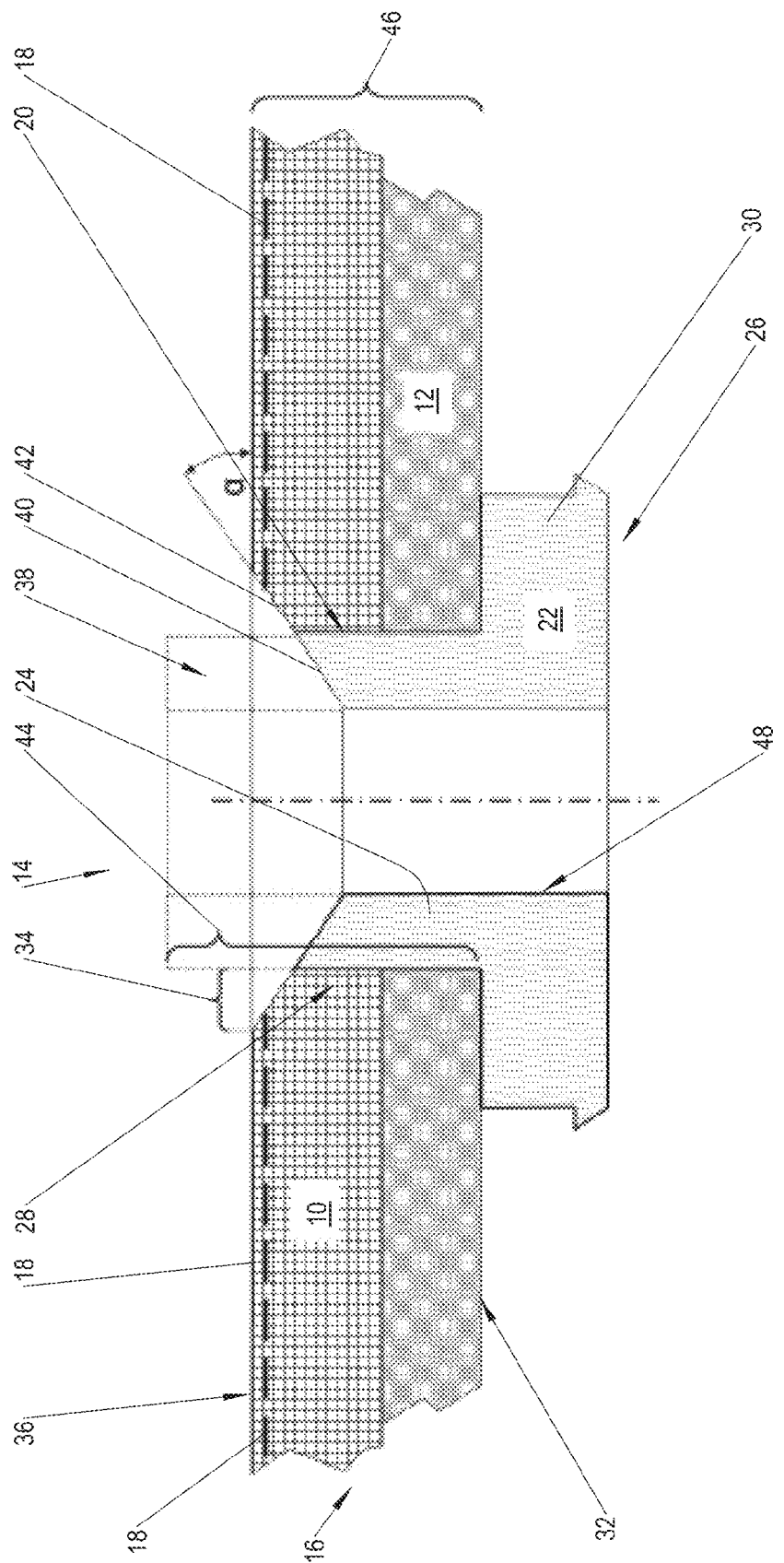
FIGS. 1, 2 show a cross-sectional representation of the connecting arrangement.
Figure 2:
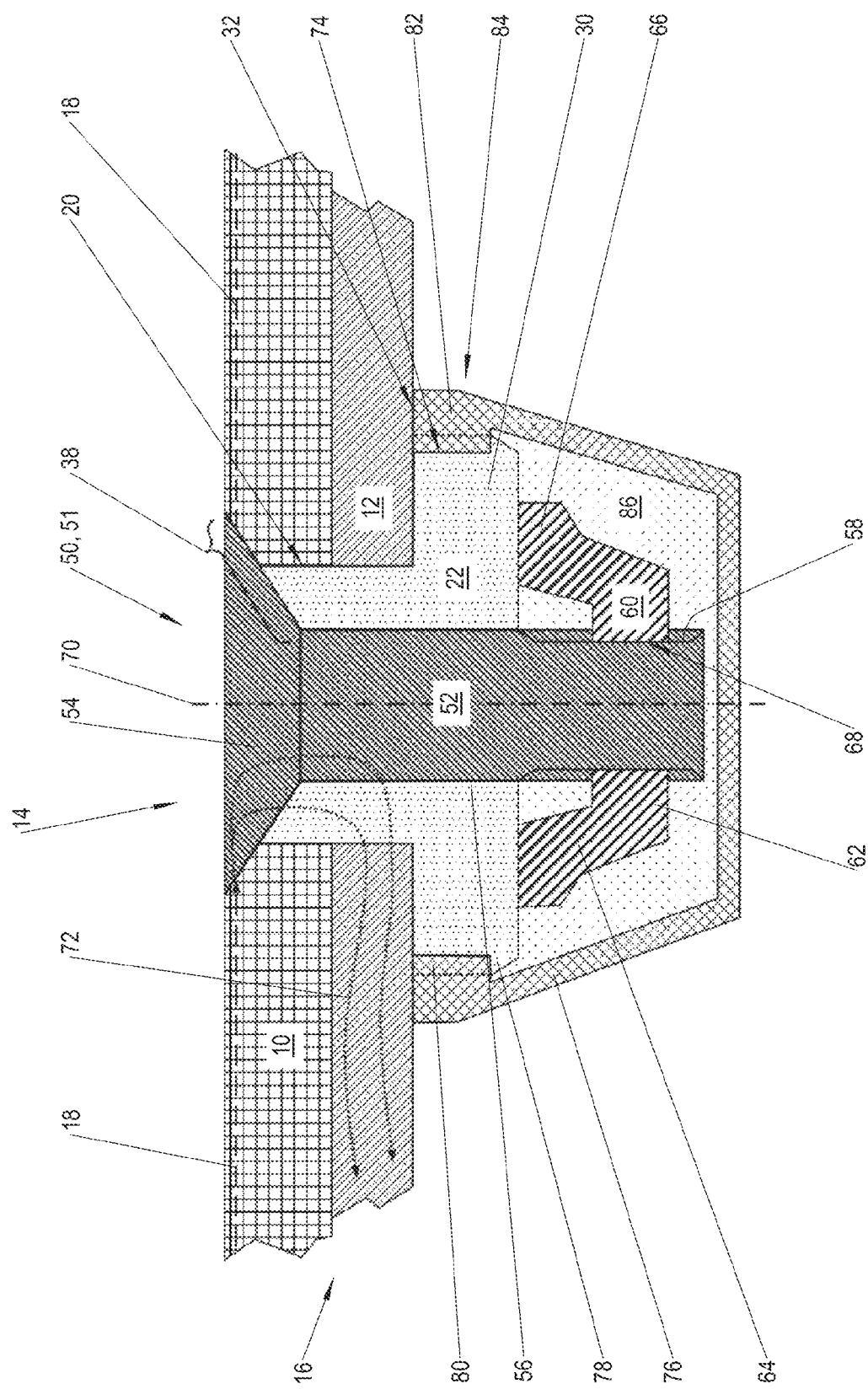

FIGS. 1 and 2 show an inventive connecting arrangement 14, wherein in FIG. 1 the connecting element is not included in the drawing in the interests of greater clarity.

Two components 10, 12 are joined together by means of the connecting arrangement 14 to form a structural assembly 16. A sealing agent, not represented, can be introduced between the components 10, 12 in at least some regions. Durably elastic, curing sealants and/or surface seals come into consideration as the sealing agent. The first component 10 is formed from a fibre composite plastic (FCP), while the second component 12 is manufactured from a metallic material. Carbon fibre-reinforced thermosetting plastics, in particular carbon fibre-reinforced epoxy resins (CFRPs), or fibre-reinforced thermoplastic plastics, preferably come into consideration as the monolithic fibre composite plastic. The metallic component 12 is preferably formed from a light-weight metal alloy, such as, for example, an aluminium alloy or a titanium alloy. In a deviation from the above both components 10, 12 can also be formed from a fibre composite plastic. Furthermore it is possible to join together more than two components 10, 12 by means of the connecting arrangement 14. An electrically conductive surface entity 18 is preferably embedded in the upper face of the first component 10 formed from fibre composite plastic. This surface entity 18, provided in at least some regions, serves as lightning protection and/or as an earth return path for the component 10 made of fibre composite plastic, which in general only has an inadequate electrical conductivity. The surface entity 18 can, for example, be constructed with a copper mesh, or similar.

A cylindrical through hole 20 is introduced into the two components 10, 12. An essentially hollow cylindrical bushing 22 is secured in the through hole 20 by means of a press fit, for example. The bushing 22 is formed from a metallic material, such as, for example, a titanium alloy or a stainless steel alloy, which features a high corrosion resistance at the interface with the component 10.

The bushing 22 comprises a hollow cylindrical shank 24 with a first end 26 and a second end 28. In the region of the first end 26 is located a similarly hollow cylindrical collar 30, directed radially outwards, which sits securely against a lower face 32 of the structural assembly 16. If necessary a sealing agent can be provided between the collar 30 and the lower face 32 of the structural assembly 16. A depression 38 is introduced into the second end 28 of the bushing (22) and also into a notional zone 34 in the shape of a circular ring of an upper face 36 of the structural assembly 16, i.e., of the first component 10, surrounding this end 28. The depression 38 comprises a bushing section 40 and a component section 42 that adjoins flush with the former and preferably with the same angle of inclination. In the example of embodiment shown in FIG. 1 the depression is embodied with an angle of depression $\alpha$ of approximately 25° with reference to the upper face 36. In a deviation from the above the angle of depression $\alpha$ can lie in a range from 15° to 75°. As a consequence of the depression 38 an original shank length 44 of the bushing 22, indicated with dotted lines, is reduced to the extent that the second end 28 of the bushing 22 terminates underneath the level of the upper face 36 of the structural assembly 16.

From this there ensues, inter alia, the advantage that a universal (standard) bushing 22 can be deployed for the purpose of connecting components 10, 12 with a varying material thickness 46. In the context of this description the material thickness 46 relates in each case to the joint (summated) material thickness of the components 10, 12, wherein if necessary a sealing agent between the components 10, 12 must also be included. Furthermore as a result of the depression 38 there ensues an essentially planar upper face 36 of the structural assembly 16, since the second end 28 of the bushing 22 does not project above the upper face 36 of the structural assembly 16. This leads, inter alia, to an aerodynamically advantageous surface 36 that can be painted without any problems. Furthermore an electrical connection of the surface entity 18 to a connecting element, not (yet) represented here, is improved.

In a deviation from the representation in FIG. 1 the original shank length 44 of the bushing 22 can also be selected to be slightly smaller than the total material thickness 46 of the components 10, 12 (undersizing of the shank length). However, the original shank length 44 may not be sized to be so small that the depression 38 extends into the second, metallic component 12. The depression 38 has a trapezoidal geometry in cross-section, but can also have a cross-sectional geometry that deviates from the latter, depending upon the shape of a head of a connecting element that is to be inserted. The cross-sectional geometry of the depression 38 is preferably configured such that a head of the connecting element, not represented here, that is to be introduced into the depression 38 after installation terminates essentially flush with the upper face 36 of the structural assembly 16.

The press fit of the bushing 22 in the through hole 20 is, for example, achieved by means of a radial, plastic expansion of the bushing 22 by means of a tool, not represented, in a manner of known art. Here the shank 24 of the bushing 22 is widened in the radial direction. In addition a continuous cylindrical hole 48 is introduced into the bushing 22; this hole serves to accommodate a connecting element (cf. in particular FIG. 2).

After the process of expanding the bushing 22 an undesignated inner diameter of the hole 48 can, if required, be brought to a prescribed design dimension, for example, by means of reaming or drilling.

FIG. 2 shows the connecting arrangement 14 in accordance with FIG. 1 with a fully installed connecting element 50.

The connecting arrangement 14 comprises, inter alia, the components 10, 12 with the through hole 20. For purposes of joining together the components 10, 12 in a durable manner a locking ring connector 51 is here accommodated in the bushing 22 in an exemplary manner as the connecting element 50. In a deviation from the above, tolerance rivets, solid rivets, blind rivets, bolt-nut connections or similar, can, for example, be deployed as connecting elements. A locking ring pin 52 of the locking ring connector 51 comprises a conical head 54, to which are attached a cylindrical shank 56 and a similarly approximately cylindrical retaining section 58.

A locking ring 60 that is part of the locking ring connector 51 is preferably permanently pressed onto the retaining section 58 by means of a tool, not represented. The locking ring 60 has an approximately cup-shaped geometry with an essentially disk-shaped floor 62, which translates into a conical wall 64, to which is attached a radially outwards pointing flange 66. An undesignated outer diameter of the flange 66 of the locking ring 60 is preferably smaller than a similarly undesignated outer diameter of the collar 30 of the bushing 22.

A recess 68 is introduced into the plane floor 62 for purposes of feeding through the retaining section 58 of the locking ring pin 52. In the course of the installation process of the locking ring connector 51 the locking ring 60 is pressed onto the retaining section 58 of the locking ring pin 52 in a force fit and/or a form fit, wherein at the same time the components 10, 12 are pulled together. Here the flange 66 of the locking ring 60 is supported on the bushing 22 and the head 54 of the locking ring pin 52 is pulled into the depression 38 with the creation of what is, ideally, a complete form fit. As a result of the depression 38 the electrically conductive surface entity 18 is exposed, so that at the same time an optimal electrical, i.e., low resistance, connection of the locking ring pin 52 to the conductive surface entity 18 in the first component 10 is achieved. An electrical current 72 originating in the electrically conductive surface entity 18 can thus pass via the locking ring connector 51, and the bushing 22, into the metallic component 12 with low electrical line losses. Such a low resistance connection of the surface entity 18 to the locking ring connector 51 with a reliable level of contact is, for example, of particular importance for lightning protection applications and earth return paths in the region of the wings of an aircraft.

In order to achieve in addition sealing of the connecting arrangement 14 that is impermeable to fluids, an optional sealing agent, not represented, can, for example, be provided between the bushing 22 and the component 12, for example a sealant and/or a surface seal. Sealing of the connecting arrangement 14 that is impermeable to fluids is, for example, indispensable in applications in the region of the wing tanks of an aircraft.

An optional cup-shaped sealing cap 76 can be secured on an outer edge 74 of the bushing 22. The sealing cap 76 is preferably secured on the outer edge 74 of the bushing 22 by means of a snap-on action. In order to achieve the snap-on action, a peripherally formed latching projection 78 is provided on at least some sections of the outer edge 74 of the bushing 22. A recess 80 within the outer edge 74 of the bushing 22 is bounded by this latching projection 78 in the shape of a nose. A projection 82 of an outer edge 84 of the sealing cap 76 peripherally formed in at least some sections engages in the recess 80 in a form fit in at least some regions. The nose-shaped latching projection 78 of the bushing 22 features an undesignated outer surface embodied so as to be inclined relative to the longitudinal axis 70, so as to ease the sliding on of the sealing cap 76 during the snap-on action.

As the sealing cap 76 is set in place a slight radial expansion of the outer edge 84 of the sealing cap 76 occurs until the projection 82 sits in the recess 80, i.e., fully behind the latching projection 78. Here the full surface of the outer edge 84 of the sealing cap 76 ideally sits on the lower face 32 of the structural assembly 16, as a result of which the desired sealing action is achieved. The sealing cap 76 is preferably manufactured from a thermoplastic and/or thermosetting plastic material, which if required is provided with fibre reinforcement.

As a result of the snap-on action of the sealing cap 76 a reliable seating on the bushing 22 is provided. In order to increase the sealing action of the sealing cap 76 further, the latter is in at least some regions filled with a durably elastic or a curing sealant 86. In addition a sealing agent, in particular a sealant 86 and/or a surface seal, can be provided underneath the outer edge 84 of the sealing cap 76 and the lower face 32 of the structural assembly 16. In place of the sealing cap 76 other functional elements can be snapped onto the bushing 22. Sensors come into consideration, for example, as functional elements. Filling status sensors for fluids, temperature sensors, or sensors for health monitoring can, for example, be snapped onto the bushing 22.

The reliable seating of the sealing cap 76 on the bushing 22, ideally over its service life, is of prime importance in the case of applications of the connecting arrangement 14 in the wing tanks of aircraft, since these are inaccessible from the external environment for practical purposes.

With the aid of FIGS. 3 to 8 the procedure in accordance with the method for the joining together of the two components, 10, 12 to form an inventive connecting arrangement 14 will be explained in more detail.

Figure 3:
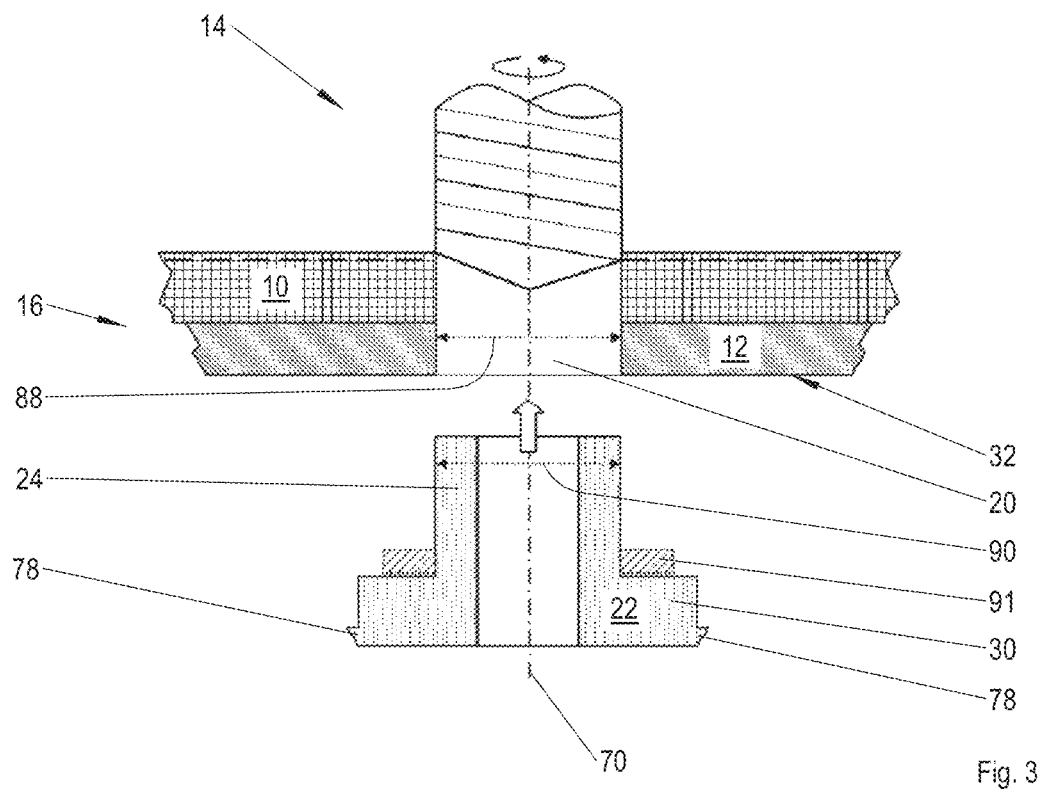
FIGS. 3-8 show a schematic representation of the method sequence during the installation of the connecting arrangement.
Figure 4:
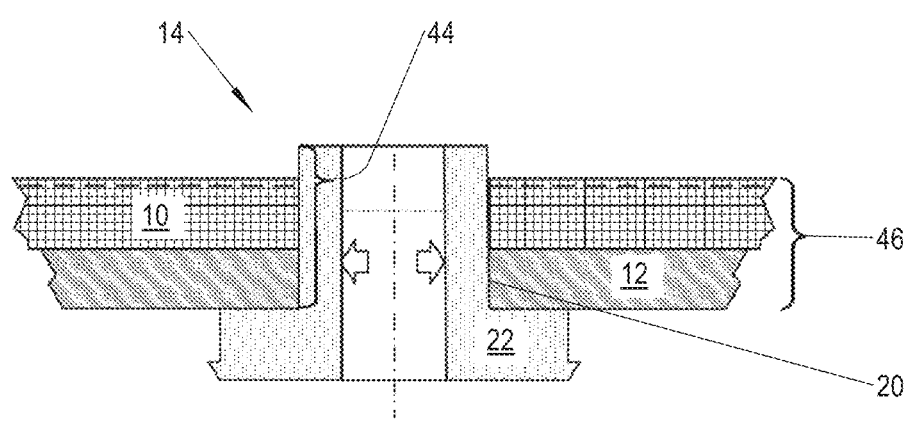

Firstly, as indicated in FIG. 3, the through hole 20 is introduced into the components 10, 12 of the structural assembly 16. The hole 20 is preferably introduced into the components 10, 12 at the same time; for this purpose these are arranged one above another. Alternatively the components 10, 12 can also be drilled in separate steps of the method. In this configuration the holes must, in a further step of the method, be aligned flush with one another to enable the introduction of the bushing 22. An inner diameter 88 of the through hole 20 must be dimensioned relative to an outer diameter 90 of the shank 24 of the bushing 22 such that the bushing 22 can be inserted into the hole 20 with an interference fit. Finally the bushing 22, as indicated by the white arrow, is introduced into the through hole 20.

Intermediate packing such as, for example, a washer 91, can optionally be arranged between the bushing 22 and the component 12; in the following figures this is no longer represented. The washer 91—as indicated in FIG. 3—preferably has a smaller outer diameter than an outer diameter of the collar 30 of the bushing 22, so that after the bushing 22 has been secured in the through hole 20 a small annular groove is formed between the collar 30 and the lower face 32. Here the depth of the annular groove transverse to the longitudinal axis 70 corresponds to half the difference between the two outer diameters, whereas its height parallel to the longitudinal axis 70 corresponds to an undesignated material thickness of the washer 91. An appropriately configured projection 82 of the sealing cap 76 can be snapped Into this annular groove, as can be seen, for example, in FIG. 2, so as to secure the cap. In this configuration the latching projection 78 formed in at least some sections on the collar 30 of the bushing 22 is no longer absolutely essential. In the inserted state the full surface of the collar 30 of the bushing 22, or the washer 91, ideally sits against the lower face 32 of the structural assembly 16.

In a further step of the method (cf. FIG. 4) the bushing 22, as indicated by the two white arrows, is expanded in the radial direction, for example, and by this means is secured in the through hole 20 by means of a press fit. The radial expansion of the bushing 22 is achieved by means of a suitable tool, not represented, such as a mandrel, for example. Alternatively the necessary press fit can also be generated by cold shrinking the bushing 22. In addition it is possible to secure the bushing 22 in the through hole 20 by means of material bonding, for example, by means of adhesive bonding.

Before the introduction of the depression the (original) shank length 44 of the bushing 22 can be greater than the material thickness 46 of the components 10, 12 would require. This enables the use of a standardised bushing 22 for a multiplicity of components 10, 12 of differing material thicknesses 46. Here the (original or initial) shank length 44 of the bushing 22 can in principle be greater than, equal to, or also less than, the material thickness 46 of the two components 10, 12, as long as the depression that is to be introduced does not extend into the metallic component 12. As a result of the radial expansion of the bushing 22 a strain hardening of the through hole 20 also ensues in the region of the metallic component 12.

Figure 5:
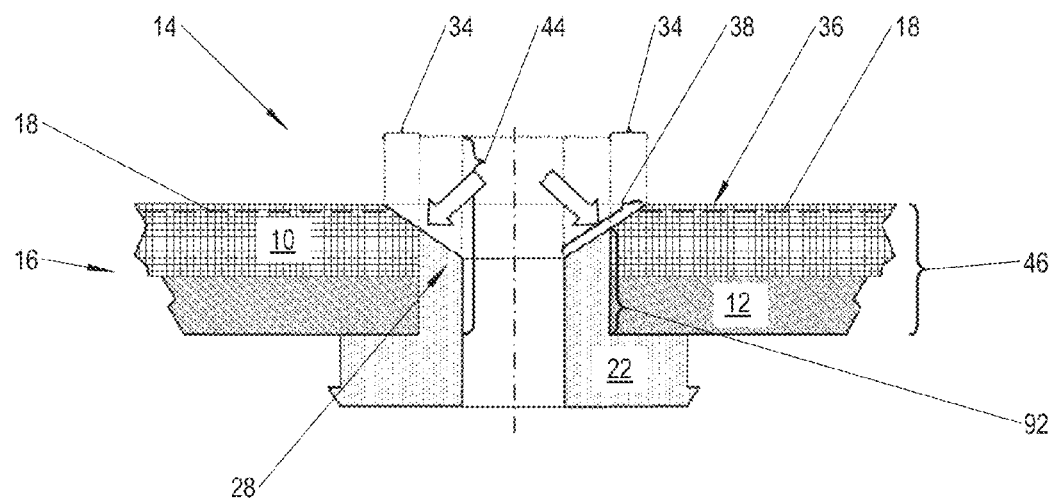

In a further step of the method schematically represented in FIG. 5—there takes place—as indicated by the two white inclined arrows—the introduction of the depression 38 into the second end 28 of the bushing 22 and the annular zone 34 of the upper face 36 of the structural assembly 16 surrounding this end 28. The introduction of the depression 38 can take place, for example, by means of machining with a suitable drilling or milling tool. As a result of the depression 38 the electrically conducting surface entity 18 is exposed, as a result of which in a following step of the method an electrical connection to a connecting element is enabled with a reliable level of contact. As a result of the introduction of the depression 38 the (original) shank length 44 of the bushing 22 is reduced to the final shank length 92, such that the second end 28 of the bushing 22 terminates within the component 10 and clearly underneath the upper face 36 of the structural assembly 16. Here the final shank length 92 of the bushing 22 is smaller than the joint material thickness 46 of the components 10, 12.

Figure 6:
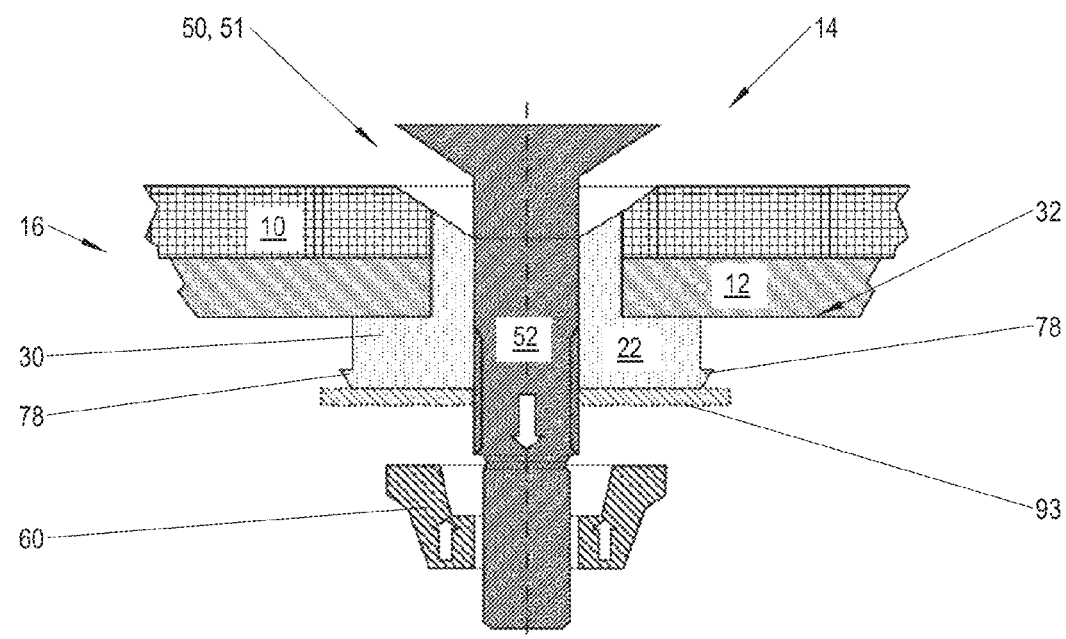

In an intermediate step schematically represented in FIG. 6 the preparation takes place for the installation of the connecting element 50; here in an exemplary manner this is a locking ring connector 51 with a locking ring pin 52 and a locking ring 60. In preparation for the installation the locking ring pin 52 and the locking ring 60 in the bushing 22, as indicated by the white arrows directed in opposite directions, are firstly joined together, i.e., positioned on one another. Between the locking ring 60 and the bushing 22 a further optional washer 93 can be arranged as possible intermediate packing. An undesignated outer diameter of the washer 93 is preferably greater than an outer diameter of the collar 30 of the bushing 22, so that the latching projection 78 can be eliminated. The projection 82 of the sealing cap 76 represented in FIG. 2 can be snapped into the undesignated annular groove formed between the washer 93 and the component lower face 32 of the structural assembly 16, for purposes of securing the cap to the connecting arrangement 14. The washer 93, i.e., the intermediate packing, is no longer represented in the following figures.

Figure 7:
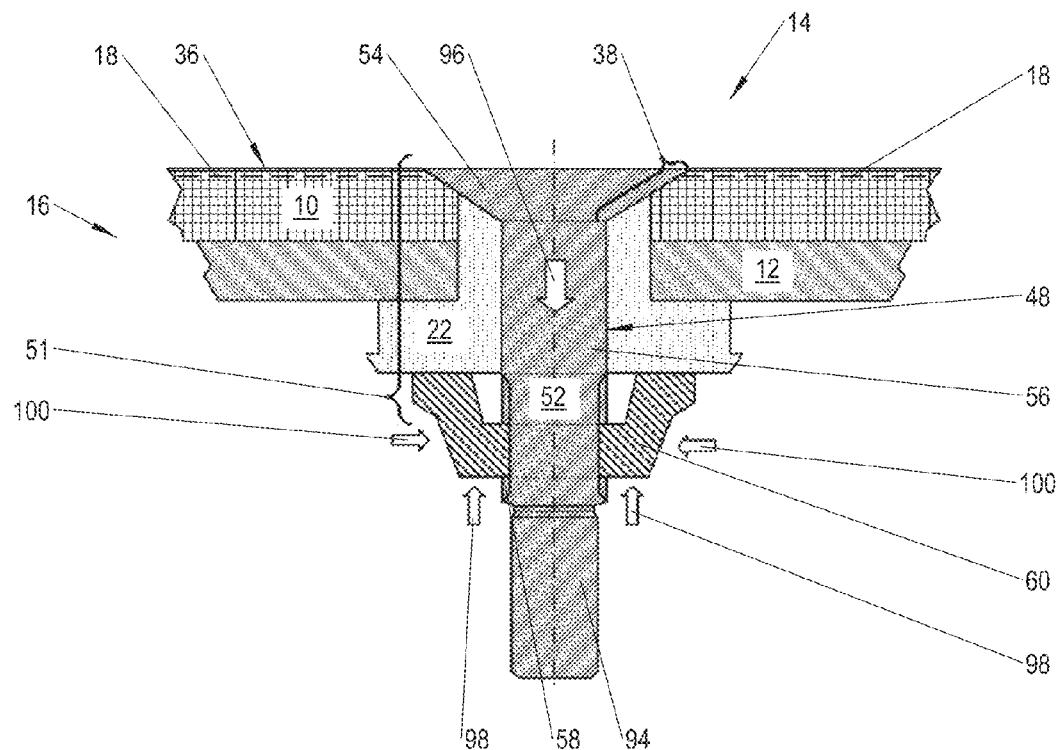

The step of the method shown in FIG. 7 shows the installation of the locking ring connector 51, consisting of the locking ring pin 52 and the locking ring 60, in the bushing 22, and thus the joining together of the components 10, 12 of the structural assembly 16 by means of the connecting arrangement 14.

In the course of the installation process the conical head 54 of the locking ring pin 52 is pulled by means of a suitable tool, not represented, on a pulling section 94 of the locking ring pin 52 with a large force in the direction of the white arrow 96 into the similarly conically designed depression 38, wherein at the same time in an opposite direction the locking ring 60—as indicated by the two smaller vertical white arrows 98—is slid in the axial direction onto the retaining section 58 of the locking ring pin 52, and at the same time is pressed radially onto the latter by means of the tool, not represented, in the direction of the two horizontal arrows 100. As a result of the radial pressure the locking ring 60 is plastically deformed and is pressed into small groove-type depressions, not represented, of the retaining section 58. After completion of the pulling-in process the pulling section 94 detaches from the shank of the locking ring pin 52 in the region of an undesignated notch as a designed fracture location (not represented in any further detail). The securement of the locking ring 60 on the retaining section 58 takes place by means of a combined press fit and form fit, as a result of which a mechanically highly secure, fatigue-free and vibration-resistant joining of the components 10, 12 ensues.

As a result of the pulling together of the components 10, 12 by means of the locking ring connector 51 the head of the locking ring pin 52 sits completely in the depression 38, flush relative to the upper face 36 of the structural assembly 16, as a result of which from the fluid mechanics perspective an advantageous smooth surface configuration ensues, which moreover can be provided with a coating, such as, for example, a paint application, without any problems. Moreover as a consequence of the depression 38 an optimal, i.e., low resistance, electrical contact is provided between the electrically conductive surface entity 18 in the component 10 and the locking ring pin 52, the bushing 22, locking ring 60 and the metallic component 12, which for lightning protection applications and an optional earth return path is of particular importance. At the end of the installation process the shank 56 of the locking ring pin 52 is preferably accommodated in a press fit (approx. 40 µm to 120 µm) in the cylindrical hole 48 of the bushing 22.

Figure 8:
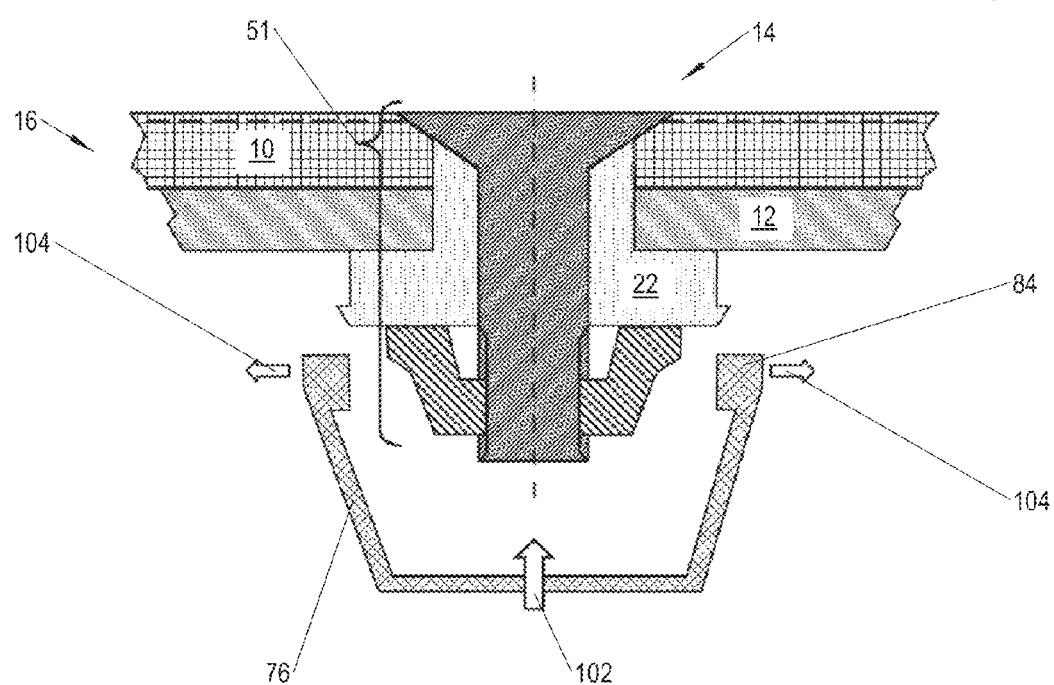

In the step of the method represented in FIG. 8 an optional sealing cap 76 is snapped onto the bushing 22 with the therein installed locking ring connector 51. By this means, inter alia, sealing of the components 10, 12 forming the structural assembly 16 is achieved that is impermeable to fluids. The sealing cap 76 is snapped onto the bushing 22 in the direction of the vertical arrow 102, wherein an outer edge 84 of the sealing cap 76 is slightly widened for a short time in the radial direction—as indicated by the two opposing horizontal white arrows 104. By means of the form fit in at least some regions between the sealing cap 76 and the bushing 22 a reliable seating of the sealing cap 76 is achieved, even in the event of severe vibration.

For purposes of further improvement of the sealing function a durably elastic and/or a curing sealant mass can be introduced underneath the sealing cap 76 in at least some regions before or after the latching of the sealing cap 76 onto the bushing 22.

Figure 9:
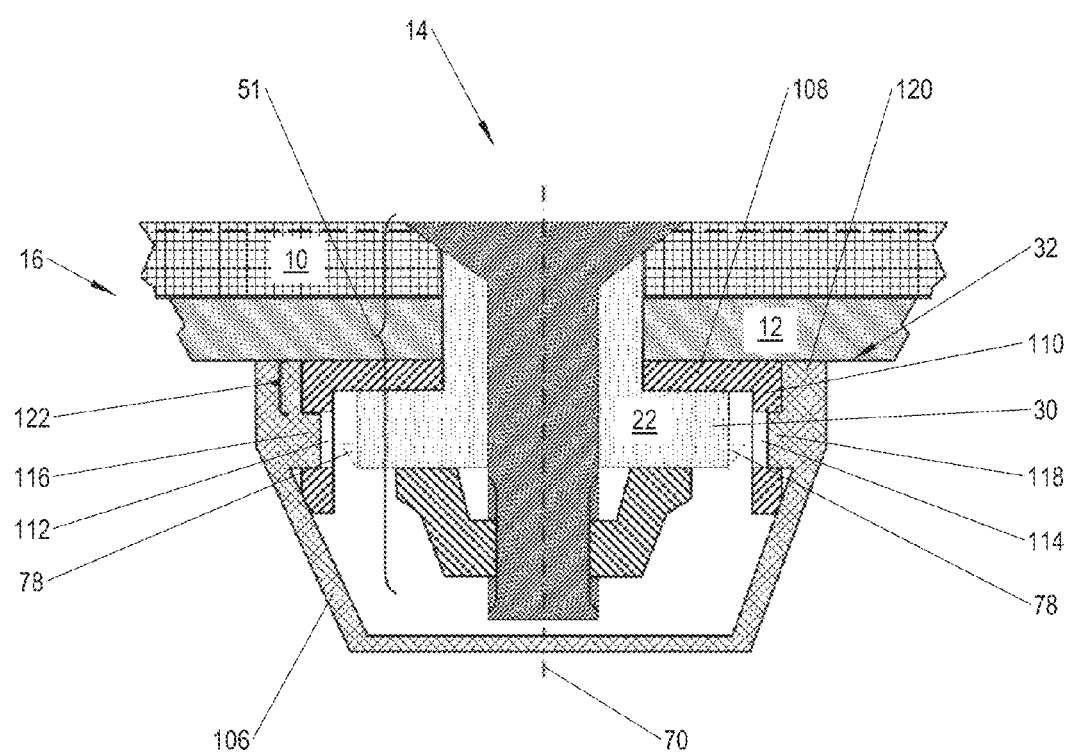
FIG. 9 shows a cross-sectional representation of the connecting arrangement with an alternatively secured sealing cap.

FIG. 9 shows an alternative securement option with a slightly modified sealing cap 106 for a completion of the connecting arrangement 14 that is impermeable to fluids, when using intermediate packing that is not in the form of a disk.

An approximately cup-shaped washer 108 with a surrounding edge 110 formed in at least some sections is arranged as a possible form of intermediate packing between the collar 30 of the bushing and the lower face of the structural assembly 16 comprising the components 10, 12. The edge 110 formed on the outer periphery of the washer 108 stands at right-angles to the lower face 32 of the structural assembly, i.e., runs parallel to the longitudinal axis 70. At least two preferably quadrilateral recesses 112, 114 are introduced into the edge 110. Preferably at least three recesses are provided, in order to enable secure seating of the sealing cap 106. Two correspondingly configured latching projections 116, 118 can be introduced into the recesses 112, 114 in a snap-on manner for purposes of securing the sealing cap 106 on the cup-shaped washer 108 in a form fit in at least some regions.

In contrast to the sealing cap 76 as defined by FIGS. 1 to 8 in the case of the sealing cap 106 according to FIG. 9 the latching projections 116, 118 are formed on a lower surrounding edge 120 of the sealing cap 106 facing towards the component 12 with an offset 122. By this means in the snapped-on state the full surface of the edge 120 surrounding the sealing cap 106 ideally sits against the lower face 32 of the structural assembly 16, i.e., of the component 12. In this configuration the latching projections 78 on the edge 30 of the bushing 22 are no longer absolutely necessary. Furthermore, the bushing 22 can if required be accommodated in the cup-shaped washer 108, and optionally can be secured against falling out such that it cannot be lost by means of suitable retaining elements, such as, for example, retaining lugs or similar, formed on the bushing 22.

In addition the sealing cap 106 can be filled at least partially with a sealing agent, not represented, in particular a sealant, in order to increase further the sealing action of the sealing cap 106. As a result of the sealing cap 106 durable sealing of the locking ring connector 51 is achieved that is impermeable to fluids.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A connecting arrangement for joining together at least two components to form a structural assembly, comprising:
   at least one component formed from a fibre composite plastic and at least one further component formed from at least one of a metal and a fibre composite plastic, the at least one further component having a first face, and the at least one component having a second face,
   a bushing secured in a through hole through the components,
   a first end of the bushing provided with a collar, which faces towards the first face of the further component of the structural assembly, and a second end of the bushing having a depression,
   a zone in the structural assembly in the shape of a circular ring surrounding the second end of the bushing and having a depression, and
   a connecting element installed in the bushing;
   wherein a head of the connecting element sits in the depression ins at least some regions in a form fit, and terminates essentially flush with the second face of the structural assembly.

2. The connecting arrangement in accordance with claim 1, wherein at least one component formed from the fibre composite plastic is provided in at least some regions with an electrically conductive surface entity.

3. The connecting arrangement in accordance with claim 2, wherein an electrical connection exists between the at least two components.

4. The connecting arrangement in accordance with claim 1, wherein the bushing and the connecting element are formed from a corrosion-resistant metal.

5. The connecting arrangement in accordance with claim 4, wherein the bushing and the connecting element are formed from one of a titanium alloy and a stainless steel alloy.

6. The connecting arrangement in accordance with claim 1, wherein the fibre composite plastic is formed from one of a thermosetting and a thermoplastic plastic material reinforced with carbon fibres, and the metal is a lightweight metal alloy, selected from one of an aluminium alloy and a titanium alloy.

7. The connecting arrangement in accordance with claim 1, wherein a functional element is applied onto one of the collar of the bushing and an intermediate packing arranged between the collar and the first surface of the component.

8. The connecting arrangement in accordance with claim 7, wherein the functional element comprises a sealing cap.

9. The connecting arrangement in accordance with claim 8, wherein the sealing cap is snapped onto one of the collar of the bushing and the intermediate packing.

10. The connecting arrangement in accordance with claim 7, wherein the intermediate packing comprises a cup-shaped washer.

11. The connecting arrangement in accordance with claim 8, wherein a sealing agent is introduced underneath the sealing cap in at least some regions to provide sealing that is impermeable to fluids.

12. The connecting arrangement in accordance with claim 11, wherein the sealing agent comprises an elastic sealant.

13. The connecting arrangement in accordance with claim 1, wherein the connecting arrangement comprises a locking ring connector with a locking ring pin and a locking ring, wherein the locking ring is attached onto a retaining section of the locking ring pin and the locking ring faces towards the collar of the bushing.

14. A method for joining together at least two components by means of a connecting arrangement for joining together at least two components to form a structural assembly, the connecting arrangement comprising:

at least one component formed from a fibre composite plastic and at least one further component formed from at least one of a metal and a fibre composite plastic, the at least one further component having a first face, and the at least one component having a second face, a bushing secured in a through hole through the components, a first end of the bushing provided with a collar and a second end of the bushing, and the method comprising the following steps:

introducing a through hole into the at least two components, securing the bushing in the through hole, wherein the collar on the first end of the bushing is turned towards the first face of the further component of the structural assembly, manufacturing a depression on a second end of the bushing and in a zone of the structural assembly in the shape of a circular ring surrounding the second end of the bushing, and installing a connecting element in the bushing to form a structural assembly, wherein a head of the connecting element sits in the depression in at least some regions in a form fit, and terminates essentially flush with the second face of the structural assembly.

15. The method in accordance with claim 14, wherein a functional element is attached onto one of the collar of the bushing and an intermediate packing arranged between the collar and the lower face of the component.

16. The method in accordance with claim 15, wherein the functional element comprises a sealing cap which is snapped onto one of the collar and the intermediate packing.

17. The method in accordance with claim 15, wherein the intermediate packing comprises a cup-shaped washer.

18. The method in accordance with claim 16, including the step of introducing a sealing agent underneath the sealing cap in at least some regions to provide sealing that is impermeable to fluids.

19. The method in accordance with claim 18, wherein the sealing agent comprises an elastic sealant.

* * * * *